United States Patent Office 3,317,591
Patented May 2, 1967

3,317,591
PREPARATION OF [4-(2-ALKYLIDENEALKANOYL) PHENOXY]-ALKANOIC ACID BY OXIDATION
Everett M. Schultz, Ambler, Pa., assignor to Merck & Co., Inc., Rahway, N.J., a corporation of New Jersey
No Drawing. Filed Dec. 3, 1963, Ser. No. 327,810
5 Claims. (Cl. 260—521)

This invention relates to a process for preparing [4-(2-methylenealkanoyl)phenoxy]alkanoic acids by the oxidation of certain organic compounds to their corresponding carboxylic acids. The said acids are highly potent diuretics characterized by the property of being able to bring about the excretion of large amounts of electrolyte from the body. Consequently, the compounds are useful in therapy for the treatment of conditions resulting from an excessively high retention of electrolyte or fluid in the body such as in the treatment of edematous conditions resulting, for example, from congestive heart failure. The compounds produced by the instant process are claimed by us in our copending application Ser. No. 155,961, filed Dec. 6, 1961 now Patent No. 3,255,241.

In general, the process of the invention comprises the oxidation of a compound depicted as Formula A infra in which the radical Z represents an alkenyl, alkinyl, carbinol, formyl, dialkoxymethyl, keto, 1,2-dihydroxyethyl or any other functional group which will undergo oxidation to produce the carboxyl radical and thus form the [4-(2-methylenealkanoyl)phenoxy]alkanoic acid B. The following equation illustrates the reaction:

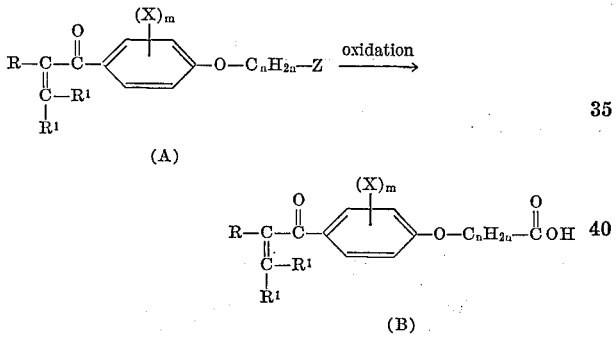

where R is a member selected from the group consisting of hydrogen, lower alkyl, e.g., methyl, ethyl, propyl, isopropyl, butyl, pentyl, hexyl, etc., halo-lower alkyl such as trifluoromethyl-lower alkyl, e.g., 2,2,2-trifluoroethyl, 2,2,2-trifluoroisopropyl, etc., cycloalkyl containing 3-6 nuclear carbon atoms, e.g., cyclopropyl, cyclopentyl, cyclohexyl, etc.,

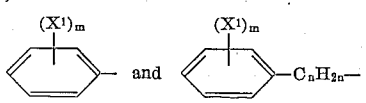

wherein $X^1$ represents a member selected from the group consisting of hydrogen, halogen, lower alkyl, trifluoromethyl, lower alkoxy and carboxy, $R^1$ is a member selected from the group consisting of hydrogen and lower alkyl, e.g., methyl, ethyl, isopropyl, butyl, pentyl, etc., X is a member selected from the group consisting of hydrogen, halogen, lower alkyl, trifluoromethyl, and lower alkoxy and, when substituted on adjacent carbon atoms of the benzene ring, two X radicals may be combined to form a 1,3-butadienylene linkage (i.e.,

—CH=CH—CH=CH—)

Z is a member selected from the group consisting of a vinyl radical

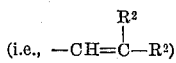

and an ethinyl radical (i.e., —C≡C—$R^2$), wherein $R^2$ is a member selected from the group consisting of hydrogen and an hydrocarbyl group (i.e., a monovalent organic radical composed solely of carbon and hydrogen) such as lower alkyl, e.g., methyl, ethyl, propyl, isopropyl, amyl, etc., aryl, e.g., phenyl, p-toluyl, naphthyl etc. or aralkyl, e.g., benzyl, phenylethyl, phenylpropyl, menaphthyl, etc., carbinol (i.e., —CH$_2$OH), formyl (i.e., —CHO), dialkoxymethyl (i.e., —CH(O-alkyl)$_2$), methylcarbonyl (i.e., —COCH$_3$) and 1,2-dihydroxyethyl (i.e.,

—CHOHCH$_2$OH)

m, in each occurence, is an integer having a value of 1-4 and n, in each occurrence, is an integer having a value of 1-5.

A preferred embodiment of the invention comprises the preparation of a class of [4-(2-methylenealkanoyl)phenoxy]acetic acids having the following formula

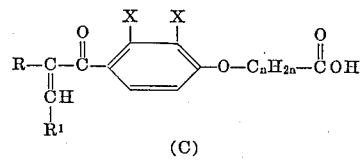

(C)

wherein R is a member selected from the group consisting of lower alkyl, e.g., ethyl, isopropyl, etc., and 2,2,2-trifluoroethyl, $R^1$ is a member selected from the group consisting of hydrogen and methyl, X is a member selected from the group consisting of hydrogen, halogen, e.g., chlorine, bromine, etc., lower alkyl, e.g., methyl and together the two X radicals may be combined to form a 1,3-butadienylene chain (i.e., —CH=CH—CH=CH—) and n is an integer having a value of 1-5. The said compounds possess particularly good diuretic activity and represent a preferred subgroup of pharmacologically useful products which fall within the scope of the invention.

It will be obvious to one skilled in the art that the R, $R^1$ and X radicals in the above planar formula should be free of easily oxidizable groups inasmuch as the presence of an oxidizable moiety other than Z in the reactants designated as A supra will result in a competing reaction which will inhibit the formation of the desired phenoxyacetic acid. For this reason the radicals R, $R^1$ and X are moieties which are relatively inert under the conditions of the reaction and undergo no chemical change in the conversion of the reactant A to its corresponding product.

Generally, any reagent capable of oxidizing the reactant A to its corresponding acid may be employed as the oxidant in the process. Suitable reagents include, for example: potassium permanganate, chromium trioxide (chromic acid, chromic anhydride), sodium hypobromite, nitric acid, hydrogen peroxide and aqueous silver oxide. It will be appreciated that the choice of an appropriate oxidant should be made with deference to the precise functional group to be oxidized inasmuch as certain groups are more easily oxidized than others. Where Z in the reactant designated as A supra represents the group

for example, a selective oxidizing agent such as sodium hypobromite in basic solution is preferred whereas chromium trioxide or potassium permanganate in acidic solutions may be employed with particularly good results when the oxidizable group is an olefin, acetylene, carbinol, 1,2-diol, aldehyde or acetal.

The reaction is conducted in any diluent which is inert to the reactants employed. Solvents which we have found to be particularly suitable in the instant process are chloroform, benzene, acetone and dioxane, although it will be apparent to one skilled in the art that any one of a wide variety of inert organic solvents may be used with equally good results.

The choice of a suitable reaction temperature is dependent largely upon the reactivity of the compound to be oxidized and the oxidizing agent employed. Where the reactant is easily amenable to oxidation for example and the oxidant employed is a relatively strong one, low temperatures in the order of 0° C. may be used with good results whereas temperatures of up to 70° C. may be employed when the reagent is a less strong oxidizing agent and the reactant is more resistant to oxidation.

The products prepared by the instant process are solids and if desired may be purified by recrystallization from a suitable solvent. Benzene or a mixture of benzene with other hydrocarbons are good solvents from which to recrystallize the products.

The reactants employed in the process are prepared by a variety of routes. The olefin reactant, for example, illustrated by planar Formula A supra wherein Z represents the group

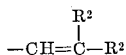

is prepared by the reaction of a 4-alkanoylphenol with formaldehyde or paraformaldehyde in the presence of a secondary amine hydrohalide, for example dimethylamine hydrohalide, to prepare the corresponding 4-(2-dimethylaminomethylalkanoyl)phenol; the Mannich amine thus produced is then deaminated to prepare the corresponding 4-(2-methylenealkanoyl)phenol and the latter compound is etherified with an alkenyl halide, e.g., an allyl halide, to produce the desired 4-(2-methylenealkanoyl)allyloxybenzene. The following equations, wherein the alkenyl halide employed is an allyl halide, illustrate this method of synthesis:

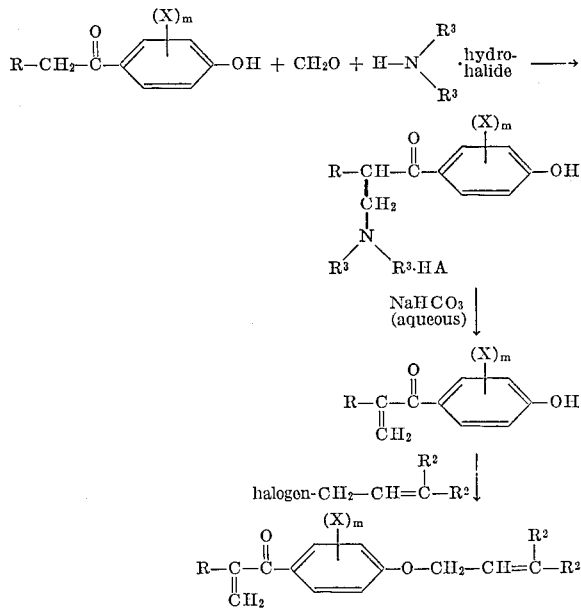

where R, R², X and m are as defined above and

represents a secondary amine, e.g., dimethylamine, morpholine, piperidine, etc. By substituting a propargyl halide (e.g., R²C≡C—CH₂—halogen) for the allyl halide in the last step of the above equation the corresponding acetylenic ether is prepared. Other appropriate halo substituted olefines and acetylenes may also be employed in the reaction to produce the desired olefinic and acetylenic ethers.

The carbinol reactants in the instant process, illustrated by planar Formula A supra wherein Z represents the group —CH₂OH, are prepared by the reaction of a 4-alkanoylphenol with an alkylene halohydrin to prepare the corresponding 4-alkanoylphenoxyalkanol derivative, followed by reaction of the said alkanol with formaldehyde or paraformaldehyde and a secondary-amine hydrohalide to produce the corresponding 4-(2-secondary-aminomethylalkanoylphenoxy)alkanol and deamination of the amino substituted alkanol to its 2-[4-(2-methylenealkanoyl) phenoxy]alkanol derivative. The following equations, wherein the halohydrin employed is ethylene halohydrin, illustrate the reaction:

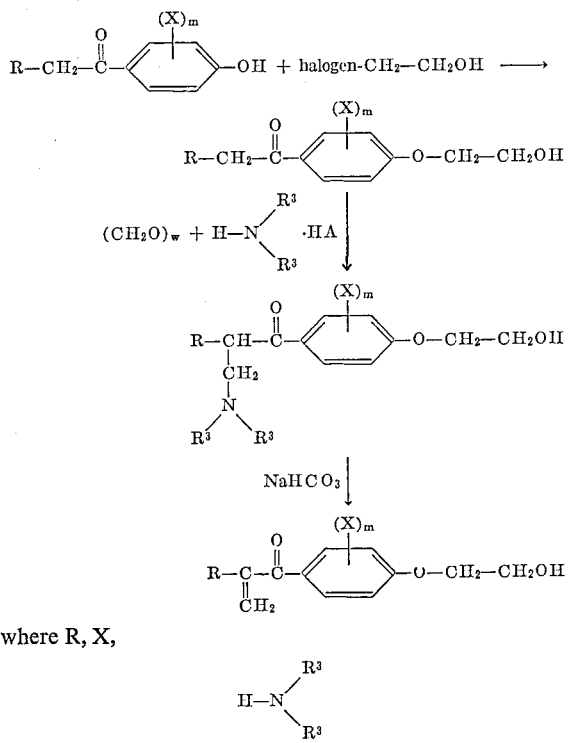

where R, X, $$H-N\begin{matrix}R^3\\R^3\end{matrix}$$

and m are as defined above, HA represents an hydrohalide and w is the integer one or a number greater than one. Mild oxidation of the [4-(2-methylenealkanoyl)phenoxy] ethanol, as, for example, with chromium trioxide, produces the acetaldehyde derivative corresponding to Formula A, wherein Z represents the group —CHO. Another particularly advantageous method of converting the carbinol to its corresponding aldehyde consists in treating the carbinol with dicyclohexylcarbodiimide in dimethylsulfoxide in the presence of phosphoric acid or a pyridinium salt (Pfitzner and Moffat. J. Am. Chem. Soc. 85: 3027 (1963)).

To prepare the homologous 2-alkylidene reactants of the [4 - (2 - methylenealkanoyl)phenoxy]alkanols described above, as for example their 4-(2-ethylidene) and 4-(2-propylidene) homologs, a separate and distinct process from the one described in the foregoing paragraph must be employed. This distinct route involves first reacting an appropriate branched chain alkanoyl halide, for example 2 - ethylbutyryl chloride, 2-propylbutyryl bromide, etc., with a phenolic ether, e.g., an anisole, to produce the corresponding 4-alkanoylphenol ether and this compound is de-etherified to its corresponding phenol and reacted with an alkylene halohydrin to produce the appropriate (4-alkanoylphenoxy)alkanol; the (4 - alkanoylphenoxy) alkanol is then halogenated to yield the corresponding [4-(2-haloalkanoyl)phenoxy]alkanol and the said [4 - (2-haloalkanoyl)phenoxy]alkanol is dehydrohalogenated to produce the appropriate [4 - (2-alkylidenealkanoyl)phenoxy]alkanoic acid. The following equations wherein R, X and m are as defined above, R¹ represents lower alkyl, $X^1$ is halogen, the phenol ether is represented by an anisole and the alkylene halohydrin reactant is represented by ethylene chlorohydrin illustrate the synthesis:

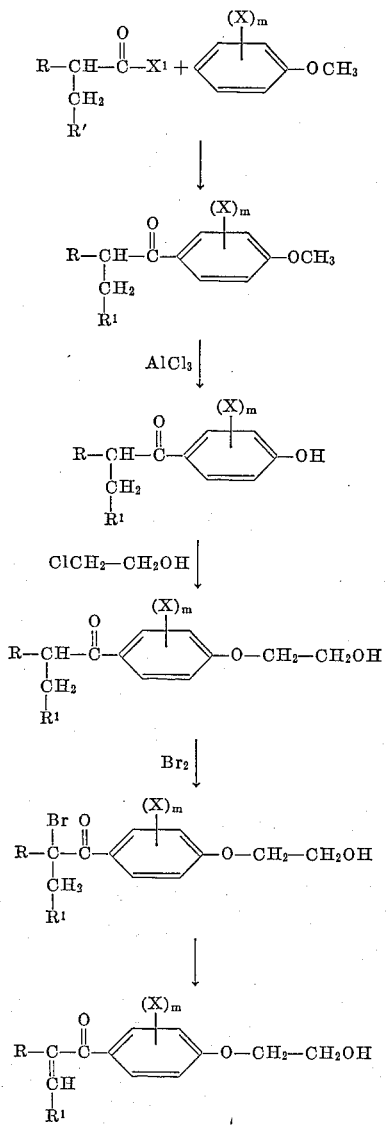

The acetal reactants of the process, i.e., where Z in the Formula A represents the group $-CH(OR^2)_2$ wherein $R^2$ is alkyl, are prepared by the reaction of a 4-alkanoylphenol with an omega-haloacetal to produce an acetal of the following formula:

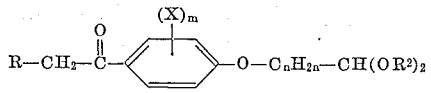

where R, $R^2$, X, m and n are as defined above. Said acetal is then reacted with formaldehyde or paraformaldehyde and an acid addition salt of a secondary amine and the Mannich amine thus produced is deaminated to the desired [4-(2 - methylenealkanoyl)phenoxy]acetaldehyde dialkylacetal by reaction of the said Mannich compound with a weak base, e.g., sodium bicarbonate.

When the reactant A is a ketone, i.e., Z represents the group

said starting material is prepared by reacting a 4-(2-methylenealkanoyl)phenol with an omega-haloalkyl methyl ketone according to the following equation:

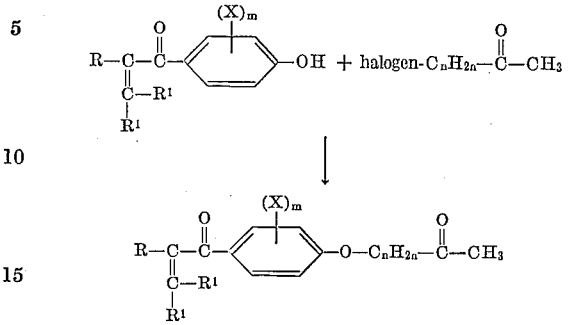

where R, $R^1$, X, m and n are as defined above. The 4-(2-methylenealkanoyl)phenol employed as the starting material in the above reaction may be prepared by a variety of methods. According to one method of preparation the methylene group is introduced at the 2-position of the alkanoyl chain by a two-step process which first involves the reaction of formaldehyde and the acid addition salt of a secondary amine with a 4-alkanoylphenol. The Mannich amine salt thus formed is treated with a weak base such as sodium bicarbonate either with or without heat to obtain the desired unsaturated acyl compound. Alternatively, instead of converting the Mannich salt directly to the unsaturated acyl compound the said Mannich derivative may first be treated with an alkyl halide or sulfate to form the corresponding quaternary ammonium salt. The quaternary ammonium salt thus obtained is then converted to the desired unsaturated acyl compound by treatment with an aqueous solution of a weak base, e.g., sodium bicarbonates. The 4-alkanoylphenols employed as the precursors in preparing the 4-(2-methylenealkanoyl)phenols are themselves prepared by reacting a phenol ether with an appropriate alkanoyl halide to produce the corresponding alkanoyl substituted phenolic ether. The ether is then de-etherified by conventional means to prepare the corresponding alkanoylphenol.

When the radical Z in the planar Formula A above represents a 1,2-dihydroxyalkyl group (e.g., 1,2-dihydroxyethyl) the starting material is a 4-(2-methylenealkanoyl)phenoxy-1,2-alkanediol (e.g., a 3-[4-(2-methylenealkanoyl)phenoxy]-1,2-propanediol) which is conveniently prepared by reacting an omega-halo-1,2-alkanediol (e.g., glycerol-α-monochlorohydrin) with a 4-alkanoylphenol to produce the corresponding omega-(4-alkanoylphenoxy)-1,2-alkanediol (e.g., 3-(4-alkanoylphenoxy)-1,2-propanediol); the said omega-(4-alkanoylphenoxy)-1,2-alkanediol is then reacted with formaldehyde or paraformaldehyde and a secondary amine, e.g., dimethylamine, to produce the corresponding Mannich amine derivative which is then deaminated to the desired 3-(2-methylenealkanoyl)phenoxy-1,2-propanediol. We have found, however, that when the 2-alkylidene radical in the reactant designated as A supra is a moiety other than methylene as for example when $R^1$ in planar Formula A represents a lower alkyl moiety and the $-C_nH_{2n}-Z$ radical represents a 1,2-propanediol group, the said 2-alkylidene reactant is most advantageously prepared by a dehydrohalogenation process which involves the prior step of first halogenating the appropriate 3-[4-(2-alkyl substituted alkanoyl)phenoxy]-1,2-propanediol to its corresponding 2-halo derivative and dehydrohalogenating the said halogenated derivative to its 3-[4-(2-alkylidenealkanoyl)phenoxy] - 1,2 - propanediol. The 3-[4-(2-alkyl substituted alkanoyl)phenoxy] - 1,2-propanediol employed as the starting material in the said synthesis is conveniently prepared by the reaction of an appropriate 2-alkyl substituted alkanoyl halide with a phenol ether, e.g., an anisole, to produce the corresponding 4-(2-alkyl substituted alkanoyl)phenol ether, followed by deetherification of the said ether to its phenol counterpart and reaction of the 4-(2-alkyl-substituted alkanoyl) phenol thus produced with a glycerol-α-monochlorohydrin to yield the desired reactant.

The examples which follow illustrate the method of preparing the [4-(2 - methylenealkanoyl)phenoxy]acetic acids according to the process of the invention and they also disclose the method of preparing the starting materials employed as reactants in the claimed synthesis. However, the examples are illustrative only and it will be apparent to one having ordinary skill that all of the products falling within the scope of generic Formula B supra may be prepared by substituting the appropriate starting materials for those used in the examples.

EXAMPLE 1

[3-chloro-4-(2-methylenebutyryl)phenoxy]acetic acid

STEP A.—3-CHLOROANISOLE

A three liter 4-necked flask is fitted with a mechanical stirrer, reflux condenser, thermometer and two graduated dropping funnels. The flask is charged with 10 N sodium hydroxide (200 ml., 2 mole), methanol (400 ml.) and m-chlorophenol (257 g., 2 mole). The flask is fitted with a steam bath, the stirrer is started and the steam regulated so that a gentle reflux is maintained throughout the reaction period. The initial reaction temperature is 55–60° C.; at the end it is 75–80° C.

One dropping funnel is charged with methyl sulfate (652 ml., 880 g., 6.98 mole) and the other with 10 N sodium hydroxide (500 ml., 5 mole). The two solutions are added simultaneously to the reaction mixture taking care that the mixture remains alkaline throughout the reaction period. The addition requires 2½ hours.

After refluxing for an additional hour, the mixture is cooled and poured into cold water (2 liters). The upper, organic phase, is separated in a separatory funnel and the aqueous phase thrice extracted with 400 ml. portions of ether. The combined ether and organic phases are dried over anhydrous sodium sulfate.

The ether is removed by distillation and the residue fractionated at reduced pressure using a still with a 30 inch column. The fraction boiling at 65–67° C./7–8 mm. (78–80° C./15 mm. or 81–83° C./18–20 mm.) is collected. The yield varies from 263 g. (92%) to 281 g. (99%) of 3-chloroanisole.

STEP B.—3-CHLORO-4-BUTYRYLANISOLE

A 2-liter resin flask is fitted with a mechanical stirrer, thermometer, reflux condenser capped with a calcium chloride drying tube and an Erlenmeyer flask attached via Gooch tubing. The apparatus is oven dried and assembled while hot. The system is flushed with dry nitrogen and petroleum ether (750 ml.) ("Benzin," B.P. 30–60° C. which had previously been dried overnight over some anhydrous aluminum chloride) is placed in the flask. m-Chloroanisole (213.9 g., 1.5 mole) and butyryl chloride (191.8 g., 1.8 mole) are added and the stirrer started. Anhydrous aluminum chloride (200 g., 1.5 mole) is placed in the Erlenmeyer flask and added, portionwise, to the reaction mixture over 30 minutes.

The reaction mixture gradually changes from a pale yellow color to dark orange. Finally a red oil begins to separate. After the addition is complete, stirring is continued for another 2 hours. Throughout the entire period of reaction, there is a vigorous evolution of hydrogen chloride. During the reaction, the temperature does not exceed 30° C.

The reaction mixture now consists of two layers. The upper, benzin layer, is decanted off and discarded. The viscous bottom layer is poured into a mixture of crushed ice (1 kg.) and concentrated hydrochloric acid (450 ml.).

After the ice has melted, the oil is separated from the aqueous phase and the latter thrice extracted with 500 ml. portions of ether. The combined organic and ether extracts are washed, first with 150 ml. of 5% hydrochloric acid, then twice with 150 ml. portions of water and finally dried over anhydrous sodium sulfate. The ether is removed by distillation and the residue distilled at reduced pressure using a still with a 30 inch column.

The fraction boiling at 100–110° C./0.1 mm. (122–138° C./1.5–2.9 mm.) is collected. The yield is 298 g. (94%). The product consists of a mixture of 3-chloro-4-butyrylanisole and 2-butyryl-5 - chloroanisole in about equal portions. Separation at this stage is difficult to obtain by the usual techniques. However, the corresponding phenols are easily separated, therefore the mixture is used for the following step.

STEP C.—2'-CHLORO-4'-HYDROXYBUTYROPHENONE

A 2-liter resin flask is equipped and assembled as described for the above reaction. n-Heptane (1500 ml.) is dried overnight over anhydrous aluminum chloride and placed in the reaction vessel with the mixture of 3-chloro-4-butyrylanisole and 2-butyryl-5-chloroanisole prepared in Step B (298.6 g., 1.4 mole). The stirrer is started and the aluminum chloride (373.4 g., 2.8 mole) is added over a period of 15 minutes. The temperature rises from 20° C. to 55° C.

The reaction mixture is refluxed for 3 hours using a steam bath as a heat source. There is a vigorous evolution of hydrogen chloride during this period and a viscous brown glass separates. Stirring becomes more difficult as the reaction progresses and may even have to be terminated. The reaction mixture is cooled to room temperature and the upper, heptane, phase decanted off. The residue is treated with a mixture of crushed ice (1 kg.) and concentrated hydrochloric acid (600 ml.). (A considerable amount of stirring and scraping is required to cause the aluminum complex to decompose.)

The mixture containing a yellow solid is thrice extracted with 500 ml. portions of ether. The combined ether extracts are washed with two 250 ml. portions of water and dried over anhydrous sodium sulfate. The ether is removed by distillation and the residue fractionated. The first fraction, B.P. 145° C./0.03 mm. (155° C./0.2 mm.), contains 2'-hydroxy-4'-chlorobutyrophenone and the second fraction, B.P. 160–178° C./0.03 mm. (155–175° C./0.2 mm.), is quite pure 2'-chloro-4'-hydroxybutyrophenone. The yield is 138 g. of 2'-chloro-4'-hydroxybutyrophenone which quickly solidifies upon cooling. Recrystallization of this material from cyclohexane (about 2 liters) gives a white crystalline product, M.P. 82.5–84° C. A second recrystallization gives little change in M.P.

STEP D.—3-CHLORO-4-(2-DIMETHYLAMINOMETHYL-BUTYRYL)PHENOL

A 250 ml. round-bottomed flask is charged with 2'-chloro-4'-hydroxybutyrophenone (73.2 g., 0.368 mole), paraformaldehyde (14.4 g., 0.467 mole), dimethyl amine hydrochloride (40 g., 0.475 mole), absolute ethyl alcohol (70 ml.) and concentrated hydrochloric acid (1.5 ml.). The solution is heated under anhydrous conditions at reflux for 3 hours and then the alcohol is removed in vacuo. The residual oil is shaken with water (120 ml.) and ether (100 ml.). The product separates from the water phase on standing. After recrystallization from water the product, 3-chloro-4-(2 - dimethylaminomethylbutyryl)phenol, melts at 89–92° C.

STEP E.—3-CHLORO-4-(2-METHYLENEBUTYRYL) PHENOL

The Mannich salt from Step D is dissolved in 120 ml. of aqueous saturated sodium bicarbonate, kept 24 hours at room temperature, acidified with concentrated hydrochloric acid and extracted with ether. The ether is dried over sodium sulfate and the residue distilled to give 16 g. of 3-chloro-4-(2-methylenebutyryl)phenol which boils at 173° C./0.04 mm. and melts at 47–49° C.

STEP F.—3-CHLORO-4-(2-METHYLENEBUTYRYL) ALLYLOXYBENZENE

Sodium (0.92 g., 0.04 mole) is dissolved in absolute alcohol (50 ml.) and the solution is added dropwise with stirring to a boiling solution of 3-chloro-4-(2-methylenebutyryl)phenol (8.4 g., 0.04 mole) and allyl bromide (6.05 g., 0.05 mole) in absolute ethanol (20 ml.) over a 2½ hour period. The mixture remains neutral during the addition. After heating an additional ½ hour the mixture is acidified with a few drops of acetic acid. The precipitated sodium bromide is removed and the solvents are evaporated at 80–90° C. The residue is dissolved in ether. The ether solution is washed with 1% sodium hydroxide solution, 2% acetic acid and with water and dried (sodium sulfate). After evaporation of the ether, the residue is distilled, B.P. 115–116° C. (0.2 mm.). The yield is 4.3 g. of colorless mobile oil identified as 3-chloro-4-(2-methylenebutyryl)allyloxybenzene.

STEP G.—[3-CHLORO-4-(2-METHYLENEBUTYRYL) PHENOXY]ACETIC ACID 3-chloro-4-(2-methylenebutyryl)allyloxybenzene (11.5 g., 0.05 mole) is dissolved in a mixture of chloroform (200 ml.) and acetic acid (200 ml.). The mixture is warmed to a 40° C. internal temperature and a solution of chromium trioxide (20 g.) in a mixture of water (40 ml.) and acetic acid (200 ml.) is added slowly with stirring, maintaining the temperature at 40° C. A black solid separates. After all the chromium oxide has been added and the temperature begins to fall, the mixture is heated on a water bath at 50° C. for 20 minutes. The solvents are then removed under reduced pressure (15 mm.) at 30–35° C. The black viscous residue is diluted with water and acidified with dilute hydrochloric acid. The mixture is extracted with ether and the ether extract is washed with dilute hydrochloric acid until clear and with water until neutral. The ether solution then is extracted with 10% sodium bicarbonate solution (250 ml. in several portions). The bicarbonate extract is acidified with hydrochloric acid. The solid that separates is collected by filtration, dried and crystallized from a mixture of benzene-cyclohexane (5:7) to obtain pure [3-chloro-4-(2-methylenebutyryl)phenoxy]acetic acid, M.P. 109–111° C.

EXAMPLE 2

[2,3-dichloro-4-(2-methylenebutyryl)phenoxy]acetic acid

STEP A.—2,3-DICHLOROANISOLE

A five-liter, 4-necked round-bottomed flask is equipped with a stirrer, reflux condenser and two dropping funnels. 2,3-dichlorophenol (400 ml.) and 10 N sodium hydroxide (245 ml., 2.45 mole) are added. The temperature rises to 55° C. The mixture is heated to 80–85° C. on a steam bath and 10 N sodium hydroxide (615 ml., 6.15 mole) is placed in one dropping funnel and dimethyl sulfate (816 ml., 1090 g., 8.6 mole) in the other. The base and dimethyl sulfate are then added simultaneously in a dropwise manner over 3½ hours with stirring. Heating and stirring then is continued for 1 hour. The mixture then is cooled and water (600 ml.) is added. The oil that separates soon solidifies. The solid is collected by filtration and dissolved in ether (500 ml.). The filtrate is extracted with ether (400 ml.), the two ether solutions are combined and dried over anhydrous sodium sulfate. The ether is evaporated and the residue is dried in a vacuum desiccator over phosphorus pentoxide. The yield is 428 g. (98%) of 2,3-dichloroanisole; M.P. 32–33° C.

STEP B.—2′,3′-DICHLORO-4′-HYDROXYBUTYROPHENONE

Butyryl chloride (128.0 g., 1.2 mole), 2,3-dichloroanisole (197.7 g., 1.11 mole), prepared as described in Step A, and carbon disulfide (400 ml.) are placed in a four-necked flask fitted with a mechanical stirrer, thermometer, reflux condenser (protected by a calcium chloride tube) and a Gooch sleeve bearing a 250 ml. Erlenmeyer flask containing anhydrous aluminum chloride (160 g., 1.2 mole). While the reaction mixture is cooled in an ice bath, the aluminum chloride is added in small portions with stirring at such a rate that the temperature of the reaction mixture does not exceed 20–25° C. The ice bath is removed and the mixture is stirred at room temperature for 1 hour, then in a water bath at 55° C. for 45 minutes and then kept at room temperature overnight.

n-Heptane (400 ml.) and aluminum chloride (160 g., 1.2 mole) then are added. The condenser is set for distillation, the mixture is stirred and heated in a water bath heated by means of a steam bath and the carbon disulfide is distilled off. A second portion of heptane (400 ml.) is added, the condenser is set for reflux, the reaction mixture is stirred and heated in a bath at 80° C. for 3 hours and then allowed to cool. The heptane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted twice with a total of two liters of 5% sodium hydroxide. The sodium hydroxide extract is stirred with decolorizing carbon (Norite) (2–3 teaspoons) and filtered by suction through a pad of diatomaceous earth (Super-Cel). Upon acidification, a light brown solid separates. This is collected by filtration, washed with water and dried at 100° C. for 3 hours.

The dried solid is dissolved in hot benzene (1 liter) and the insoluble matter is removed by filtration. Upon cooling, a slightly colored solid separates. This is dissolved in hot benzene (750 ml.), the solution is allowed to cool to room temperature and then chilled to 10° C. in a refrigerator. The product (203 g., 85%); M.P. 109–110.5° C., is collected by filtration. The product is taken up in 1500 ml. of hot benzene, treated with decolorizing carbon (Norite) and filtered. Upon cooling, a white solid identified as 2′,3′-dichloro-4′-hydroxybutyrophenone (180 g., 75%); M.P. 109–110° C., separates.

STEP C.—2,3 - DICHLORO - 4 - [2 - (DIMETHYLAMINOMETHYL)BUTYRYL]PHENOL HYDROCHLORIDE

2′,3′-dichloro - 4′ - hydroxybutyrophenone (46.62 g., 0.2 mole), paraformaldehyde (12.01 g., 0.4 mole), dimethylamine hydrochloride (32.62 g., 0.4 mole), concentrated hydrochloric acid (1 ml.) and absolute ethanol (46 ml.) are combined and heated under reflux, protected from moisture, for 3 hours.

After standing overnight at room temperature, the reaction solution is concentrated under reduced pressure to a viscous oil. The residual oil is triturated with water (150 ml.) and filtered to remove a white solid which is shown to be starting phenol (29% recovered). The aqueous filtrate is extracted with ether and then concentrated to dryness under reduced pressure to give 62.3 g. of 2,3-dichloro - 4 - [2-dimethylaminomethyl)butyryl]phenol hydrochloride, a white solid, M.P. 130–150° C.

Two recrystallizations from absolute ethanol give 27.3 g. (59%) of material melting at 156–159° C.

STEP D.—2,3-DICHLORO-4-(2-METHYLENEBUTYRYL) PHENOL 2,3 - dichloro - 4 - [2 - (dimethylaminomethyl)butyryl] phenol hydrochloride (1.0 g., 0.00306 mole) is dissolved in water (25 ml.) and the solution made basic by the addition of saturated sodium bicarbonate solution. The colorless solution is heated on a steam bath (80–90° C.) for 30 minutes, cooled and made acid to Congo red test paper by the addition of 6 N hydrochloric acid. The resulting semi-solid is extracted with ether and the combined extracts are dried over anhydrous magnesium sulfate. The ether is evaporated under reduced pressure to give 0.65 g. (87%) of 2,3 - dichloro-4-(2-methylenebutyryl)phenol, M.P. 82–84° C.

Two recrystallizations from hexane give white prisms melting at 84–85° C.

STEP E.—2,3-DICHLORO-4-(2-METHYLENEBUTYRYL) ALLYLOXYBENZENE

By following substantially the procedure described in Step F of Example 1, 2,3-dichloro - 4 - (2-methylenebutyryl)phenol is converted to 2,3-dichloro-4-(2-methylenebutyryl)allyloxybenzene.

STEP F.—[2,3-DICHLORO-4-(2-METHYLENEBUTYRYL)PHENOXY]ACETIC ACID

By following substantially the procedure described in Step G of Example 1, 2,3-dichloro - 4 - (2-methylenebutyryl)allyloxybenzene is converted to [2,3-dichloro-4-(2-methylenebutyryl)phenoxy]acetic acid, M.P. 121–122° C.

EXAMPLE 3

[3-chloro-4-(2-methylenebutyryl)phenoxy]acetic acid

STEP A.—2'-CHLORO-4'-(2-HYDROXYETHOXY)BUTYROPHENONE

A 1 liter four-necked, round-bottomed flask fitted with a stirrer, thermometer and water-cooled condenser protected from the atmosphere with a calcium chloride drying tube is charged with absolute ethyl alcohol (375 ml.) and sodium metal (23 g., 1.0 gram atom). When the reaction ceases, the solution is treated with 2'-chloro-4'-hydroxybutyrophenone (199 g., 1.0 mole), prepared as described in Steps A–C of Example 1, and then with ethylene bromohydrin (125 g., 1.0 mole). The reaction is heated at reflux on a steam bath for six hours, filtered, and the ethyl alcohol removed in vacuo. The residue is taken up in ether (500 ml.), washed with several portions of 5% sodium hydroxide, water, and dried over sodium sulfate. The ether is evaporated and the product distilled to give 89 g. (37%) of 2'-chloro-4'-(2-hydroxyethoxy)butyrophenone which distills at 155–156° C./0.02 mm.

STEP B.—2-[3-CHLORO-4-(2-METHYLENEBUTYRYL)PHENOXY]ETHANOL

A 50 ml. round-bottomed flask is charged with 2'-chloro-4'-(2 - hydroxyethoxy)butyrophenone (24.3 g., 0.10 mole), paraformaldehyde (3.5 g., 0.117 mole), dimethylamine hydrochloride (8.9 g., 0.106 mole) and glacial acetic acid (1 ml.). The reaction mixture is heated on a stem bath for 2½ hours, treated with 500 ml. of water and extracted with ether (600 ml. in 3 portions) to remove starting material. The aqueous phase is treated with 5% sodium hydroxide until basic and extracted with ether (400 ml. in several portions). The ether fraction is dried over sodium sulfate and evaporated in vacuo. The product which results amounts to 2.5 g. of 2-[3 - chloro - 4 - (2 - methylenebutyryl)phenoxy]ethanol which distills at 180° C./0.5 mm.

STEP C.—[3-CHLORO-4-(2-METHYLENEBUTYRYL)PHENOXY]ACETIC ACID

The 2-[3 - chloro - 4 - (2 - methylenebutyryl)phenoxy]ethanol (20.32 g., 0.08 mole) is dissolved in benzene (150 ml.) and acetic acid (25 ml.) is added. To this is added slowly with stirring at 0° C. a solution of chromic anhydride (10.8 g., 0.108 mole) in acetic acid. The mixture is stirred for ½ hour at 25° C. and 2 hours at 70° C.

The mixture is cooled and diluted with water and extracted with ether. The ether layer is extracted with sodium bicarbonate solution. The bicarbonate extract is washed with ether and acidified with hydrochloric acid. The solid that separates is collected by filtration and crystallized from benzene to obtain [3-chloro-4-(2-methylenebutyryl)phenoxy]acetic acid, M.P. 109–111° C.

EXAMPLE 4

[3-chloro-4-(2-methylenebutyryl)phenoxy]acetic acid

STEP A.—[3-CHLORO-4-(2-METHYLENEBUTYRYL)PHENOXY]ACETALDEHYDE

2 - [3 - chloro - 4 - (2 - methylenebutyryl)phenoxy]ethanol (20.3 g., 0.08 mole), prepared as described in Step B of Example 2, is dissolved in pure benzene (150 ml.), acetic acid (25 ml.) is added and the mixture is cooled to 0° C. To this is added slowly with stirring at 0° C. a solution of chromic anhydride (5.4 g., 0.054 mole) in acetic acid. The mixture is stirred for ½ hour at 0° C. and ½–1 hour at 25–30° C. The mixture is diluted with water and the benzene layer is separated. The aqueous phase is extracted with ether and the combined ether and benzene extracts are washed with sodium bicarbonate until free of acid, then with water until neutral and the solvents are evaporated. The residue is shaken with 30% sodium bisulfite solution for 3 hours and then the mixture is extracted with ether to remove the non-aldehyde material. The mixture is then covered with a layer of ether and gradually acidified with hydrochloric acid with shaking. As the aldehyde is freed from the complex it is taken up in the ether. The ether layer is separated and dried over sodium sulfate. The ether is evaporated to obtain [3-chloro-4-(2-methylenebutyryl)phenoxy]acetaldehyde.

An alternate method for the preparation of [3-chloro-4-(2-methylenebutyryl)phenoxy]acetaldehyde consists in dissolving 2 - [3-chloro-4-(2-methylenebutyryl)phenoxy]ethanol (25.4 g., 0.1 mole) in excess dimethylsulfoxide and adding dicyclohexylcarbodiimide (61.9 g., 0.3 mole) and phosphoric acid (4.9 g., 0.05 mole). The mixture is stirred at 20–25° C. until the precipitate of dicyclohexylurea ceases to increase. The excess carbodiimide is then decomposed by the addition of water (5.4 ml.) and the solid is removed by filtration and washed on the filter with a large amount of water, which is allowed to mix with the original filtrate. The solid on the filter then is washed with ether and the combined aqueous-ether filtrate is transferred to a separatory funnel, more ether is added and the mixture is shaken thoroughly. The layers then are separated and the [3-chloro-4-(2-methylenebutyryl)phenoxy]acetaldehyde is isolated from the ether extract by the process described in the preceding paragraph.

STEP B.—[3-CHLORO-4-(2-METHYLENEBUTYRYL)PHENOXY]ACETIC ACID

[3 - chloro - 4 - (2 - methylenebutyryl)phenoxy]acetaldehyde (20.0 g., 0.08 mole) is dissolved in benzene (150 ml.) and acetic acid (25 ml.) is added. To this is added with stirring at 0° C. a solution of chromic anhydride (5.4 g., 0.054 mole) in acetic acid. The mixture then is stirred at 25–30° C. for ½ hour and at 65–70° C. for 1 hour.

The mixture is cooled and diluted with water and extracted with ether. The ether layer is extracted with sodium bicarbonate solution. The bicarbonate extract is washed with ether and acidified with hydrochloric acid. The solid that separates is collected by filtration and crystallized from benzene to obtain [3-chloro-4-(2-methylenebutyryl)phenoxy]acetic acid, M.P. 109–111° C.

EXAMPLE 5

[3-chloro-4-(2-methylenebutyryl)phenoxy]acetic acid

STEP A.—(3-CHLORO-4-BUTYRYLPHENOXY)ACETALDEHYDE DIETHYLACETAL

A 250 ml., 3-necked, round-bottomed flask fitted with a stirrer, thermometer and water-cooled condenser protected from the atmosphere with a calcium chloride tube is charged with absolute ethyl alcohol (150 ml.) and sodium metal (11.5 g., 0.5 atoms). When the reaction is complete, the solution is treated with 3-chloro-4-butyrylphenol (99.5 g., 0.50 mole), prepared as described in Step C of Example 1, and bromacetal (98.5 g., 0.50 mole). The solution is transferred to an autoclave and heated at 155° C. for four hours.

The reaction is cooled, filtered from the sodium bromide which forms, and freed from alcohol by evaporation in vacuo. The product is treated with 400 ml. of water and extracted with ether (300 ml.). After drying the ether phase over sodium sulfate, the ether is evaporated and the product distilled. The yield is 130 g. of (3-chloro-4-butyrylphenoxy)acetaldehyde diethylacetal boiling at 178–184° C./0.08 mm.

STEP B.—[3 - CHLORO - 4 - (2 - METHYLENEBUTYRYL)PHENOXY]ACETALDEHYDE DIETHYLACETAL

A 100 ml. round-bottomed flask is charged with [3-chloro-4-butyrylphenoxy]acetaldehyde diethylacetal (31.5 g., 0.10 mole), paraformaldehyde (4 g., 0.133 mole), dimethylamine hydrochloride (10 g., 0.17 mole), absolute ethyl alcohol (30 ml.) and concentrated hydrochloric acid (0.4 ml.).

The solution is heated at reflux for 20 hours, during which time four 1 g. additions of paraformaldehyde are made. The solution is treated with 200 ml. of water and extracted with ether (two 100 ml. portions). The aqueous phase is made basic with sodium bicarbonate, heated ¼ hour on a steam bath and extracted with ether (three 100 ml. portions). The ether solution is dried over sodium sulfate, evaporated in vacuo, and the product distilled to give 2.5 g. (7.7%) of [3-chloro-4-(2-methylenebutyryl)phenoxy]acetaldehyde diethylacetal, B.P. 185° C./0.3 mm.

STEP C.—[3-CHLORO-4-(2-METHYLENEBUTYRYL) PHENOXY]ACETIC ACID

The above acetal (0.02 mole) is dissolved in acetone (20 ml.) and to the solution chromium trioxide (8.0 g., 0.08 mole) in water (30 ml.) and concentrated sulfuric acid (5.6 ml.) is added with stirring at 0° C. over a 2 hour period. After an additional half hour the reaction mixture is poured into water. The aqueous mixture is extracted with ether and the ether extract is then extracted with sodium bicarbonate solution. The sodium bicarbonate extract is washed with ether and acidified by addition of hydrochloric acid. The solid that separates is collected, dried and crystallized from benzene to obtain the product, [3-chloro-4-(2-methylenebutyryl)phenoxy]acetic acid, M.P. 109–111° C.

EXAMPLE 6

*[3-chloro-4-(2-methylenebutyryl)phenoxy]acetic acid*

STEP A.—[3-CHLORO-4-(2-METHYLENEBUTYRYL) PHENOXL]ACETONE

Chloroacetone (11 g., 0.12 mole) is dissolved in acetone (30 ml.) and potassium iodide (0.5 g.) added and the mixture stored in the dark for 16 hours. 3-chloro-4-(2-methylenebutyryl)phenol (16.8 g., 0.08 mole), prepared as described in Steps A–E of Example 1, acetone (40 ml.) and anhydrous potassium carbonate (11 g., 0.08 mole) are placed in a 300 ml. round-bottomed, 3-necked flask equipped with a mechanical stirrer, dropping funnel and reflux condenser protected with a drying tube.

The mixture is stirred and refluxed and the chloracetone solution added dropwise over a period of an hour. The heating is terminated after another hour and the stirring continued for 16 hours. The mixture is filtered. The filtrate is evaporated to dryness and the residue dissolved in ether. The ether extract is washed with water, then with 2% aqueous sodium hydroxide solution and finally dried over anhydrous sodium sulfate.

After evaporation of the ether, the residue is fractionally distilled at reduced pressure. The material boiling at 140–145° C./0.2 mm. is redistilled and the fraction boiling at 138–140° C./0.1 mm. is collected. The yield is 3 g. of [3-chloro-4-(2-methylenebutyryl)phenoxy]acetone (14%).

STEP B.—[3-CHLORO-4-(2-METHYLENEBUTYRYL) PHENOXY]ACETIC ACID

A solution of sodium hypobromite is prepared by adding 15 ml. of bromine to a solution of sodium hydroxide (42 g., 1.05 mole) in water (200 ml.) at 0° C. This is warmed to 30° C. and [3-chloro-4-(2-methylenebutyryl)phenoxy]acetone (14.7 g., 0.067 mole) in dioxane (150 ml.) is added at 30–40° C. over 30 minutes with stirring. Stirring is continued for 15 minutes and then the excess hypobromite is removed by addition of sodium bisulfite. The mixture is rendered neutral by the addition of hydrochloric acid and the bromoform and dioxane are removed at 30–40° C. under reduced pressure. The residue is acidified and the [3-chloro-4-(2-methylenebutyryl)phenoxy]acetic acid separated. It is crystallized from benzene. The M.P. is 109–111° C.

EXAMPLE 7

*[3-chloro-4-(2-methylenebutyryl)phenoxy]acetic acid*

STEP A.—3-(3-CHLORO-4-BUTYRYLPHENOXY)-1,2-PROPANEDIOL

Sodium (7.9 g.) is dissolved in absolute ethanol (200 ml.) and the resulting solution of sodium ethoxide is added over an half hour dropwise with stirring to a solution of 2'-chloro-4'-hydroxybutyrophenone (64.2 g.; 0.3 mole) in absolute ethanol (200 ml). The mixture is heated to boiling and then glycerol α-monochlorohydrin (32.34 g.; 0.33 mole) is added dropwise with stirring. A vigorous reaction takes place and sodium chloride separates. After addition of the halide is complete the mixture is stirred and refluxed for an additional hour. The alcohol then is removed by distillation, water is added to dissolve the precipitate of sodium chloride and the oily product is extracted with ether. The ether layer is washed with water, dried over sodium sulfate and the ether is evaporated. The residue is distilled at reduced pressure to obtain 3-(3-chloro-4-butyrylphenoxy)-1,2-propanediol.

STEP B.—3-[3-CHLORO-4-(2-METHYLENEBUTYRYL) PHENOXY]-1,2-PROPANEDIOL 3-(3-chloro-4-butyrylphenoxy)-1,2-propanediol (27.2 g.; 0.1 mole), paraformaldehyde (3 g.; 0.1 mole) and dimethylamine hydrochloride (8.1 g.; 0.1 mole) are added to absolute ethanol (40 ml.) in a reaction flask protected from moisture by a calcium chloride tube. The mixture is stirred and heated for 6½ hours, is cooled, and absolute ether (250 ml.) is added. A white solid separates. The solid is collected by filtration and dissolved in water. The solution is made basic by the addition of 10% sodium bicarbonate solution and heated at 80–90° C. for 10 minutes. The solution is cooled, acidified with hydrochloric acid, and extracted with ether. The ether extract is dried and evaporated. The residue is distilled at reduced pressure to obtain 3-[3-chloro-4-(2-methylenebutyryl)phenoxy]-1,2-propanediol.

STEP C.—[3-CHLORO-4-(2-METHYLENEBUTYRYL) PHENOXY]ACETIC ACID

3-[3-chloro-4-(2-methylenebutyryl)phenoxy]-1,2-propanediol (14.2 g.; 0.05 mole) is dissolved in acetone (150 ml.). Chromium trioxide (15 g., 0.15 mole) in water (180 ml.) and concentrated sulfuric acid (18 ml.) is added with stirring at −10° C. (internal temperature) over a 2 hour period. After stirring for an additional 30 minutes, the mixture is poured into water (500 ml). The solid that separates is collected by filtration and dissolved in dilute sodium bicarbonate solution. The solution is extracted with ether and acidified. The solid that separates is crystallized from benzene-cyclohexane to obtain [3-chloro-4-(2-methylenebutyryl)phenoxy]acetic acid, M.P. 109–111° C.

EXAMPLE 8

*[2,3-dichloro-4-(2-ethylidenebutyryl)phenoxy]acetic acid*

STEP A.—2-ETHYL-2',3'-DICHLORO-4'-HYDROXYBUTYROPHENONE

A mixture of 2,3-dichloroanisole (53.11 g., 0.3 mole), prepared by the process described in Step A of Example 2, carbon disulfide (350 ml.) and 2-ethylbutyryl chloride (80.77 g., 0.6 mole) is treated, under anhydrous conditions, with aluminum chloride powder (40.00 g., 0.3 mole) over a period of 5 minutes with stirring. The mixture is stirred for 6 hours at room temperature and then allowed to stand at room temperature overnight. The reaction mixture is heated with stirring in a 55° C. water bath until the evolution of hydrogen chloride ceases (1½ hours), cooled to room temperature and treated, under anhydrous conditions, with aluminum chloride powder (40.00 g., 0.3 mole) over a period of 5 minutes with stirring. The carbon disulfide is removed by distillation, an equal volume of dry heptane is added and the mixture is heated on a steam bath with stirring for 3 hours. After cooling to room temperature the heptane is decanted and the gummy residue is added to a mixture of ice (450 g.) and concentrated hydrochloric acid (45 ml.). The resulting oil is extracted with ether, dried over anhydrous sodium sulfate and the ether then removed under reduced pressure to give a semi-solid residue. This material is treated with excess 5% aqueous sodium hydroxide solution and heated under reflux for 1 hour, then cooled and extracted with ether to remove insoluble oil. The clear aqueous solution is acidified with concentrated hydrochloric acid and the residual oil is distilled to give 34.45 g. (44%) of 2-ethyl-2',3'-dichloro-4'-hydroxybutyrophenone in the form of a liquid, B.P. 140–142° C. at 0.5 mm. pressure. After three recrystallizations from hexane, 2 - ethyl - 2',3' - dichloro - 4' - hydroxybutyrophenone is obtained in the form of white needles, M.P. 85–86° C.

STEP B.—3-[2,3-DICHLORO-4-(2-ETHYLBUTYRYL) PHENOXY]-1,2-PROPANEDIOL

By substituting an equimolar amount of 2-ethyl-2',3'-dichloro-4'-hydroxybutyrophenone for the 2'-chloro-4'-hydroxybutyrophenone employed in Step A of Example 7, and following substantially the procedure described therein, 3 - [2,3 - dichloro - 4 - (2 - ethylbutyryl)phenoxy]-1,2-propanediol is prepared.

STEP C.—3-[2,3-DICHLORO-4-(2-BROMO-2-ETHYLBUTYRYL)PHENOXY]-1,2-PROPANEDIOL

The product of Step B (33.5 g., 0.1 mole) is dissolved in carbon tetrachloride and bromine (16 g., 0.1 mole) is added dropwise with stirring as rapidly as the bromine is decolorized. The reaction mixture then is shaken with dilute sodium bisulfite solution and the organic layer is separated and evaporated to dryness under reduced pressure. The 3-[2,3-dichloro-4-(2-bromo-2-ethylbutyryl) phenoxy]-1,2-propanediol thus obtained is used directly in the next step.

STEP D.—3-[2,3-DICHLORO - 4 - (2 - ETHYLIDENEBUTYRYL)PHENOXY]-1,2-PROPANEDIOL

The product prepared in Step C (20.7 g., 0.05 mole) is dissolved in dimethylformamide (100 ml.) and lithium bromide (14 g., 0.15 mole) is added. The mixture is heated at 80–90° C. for 4 hours and then cooled and added to water (1 liter). The solid that separates is 3-[2,3 - dichloro - 4 - (2 - ethylidenebutyryl)phenoxy] - 1,2-propanediol, which is purified by crystallization from benzene.

STEP E.—[2,3-DICHLORO-4-(2-ETHYLIDENEBUTYRYL)PHENOXY]ACETIC ACID

By substituting an equimolar amount of 3-[2,3-dichloro-4-(2-ethylidenebutyryl)phenoxy]-1,2-propanediol for the 3 - [3 - chloro - 4 - (2 - methylenebutyryl)phenoxy]-1,2-propanediol of Step C, Example 7, and following substantially the procedure described therein, [2,3-dichloro-4-(2-ethylidenebutyryl)phenoxy]acetic acid is prepared, M.P., 124.5–125.5° C.

Following the procedure described in the foregoing examples, by substitution of the appropriate reactants for those recited therein, all of the phenoxyacetic acids embraced by the invention may be prepared. Thus, for example, the 4-alkanoylphenols and 4-alkanoylnaphthols employed as intermediates in the process may be prepared by the choice of the appropriate phenol or naphthol starting material and conversion of the said phenol or naphthol reactant to the corresponding phenol or naphthol ether, as shown in Step A of Example 1; the said ether is then reacted with an appropriate alkanoyl halide to produce the desired 4-alkanoyl derivative as disclosed in Step B of Example 1 and the said alkanoyl substituted compound is deetherified to its corresponding 4-alkanoylphenol or 4-alkanoylnaphthol as set forth in Step C of Example 1. By substituting the 4-alkanoylphenol or 4-alkanoylnaphthol thus produced for the corresponding phenol reactants described in Step D of Example 1 and Steps A of Examples 2 and 4 and following the procedures described in each of Examples 1–5, the corresponding vinyl, ethinyl, carbinol, formyl, dialkoxymethyl, methyl carbonyl and 1,2-dihydroxyethyl derivatives may be prepared and converted to their acetic acid counterparts. The following table illustrates the conversion of various 4-alkanoyl substituted phenols to their corresponding [4-(2-methylenealkanoyl)phenoxy]acetic acid derivatives. In each instance the said 4-alkanoylphenols were prepared according to Steps A–C of Example 1 and then converted to their final products by following substantially the procedure described in the examples set forth in the last column of the table.

TABLE 1

| Ex. No. | Reactant | Product | Method of Prep.—Example (Steps) |
|---|---|---|---|
|  | R—CH$_2$—C(O)—[X$^3$,X$^2$-phenyl]—OH | R—C(O)—C(=CH—R$^1$)—[X$^3$,X$^2$-phenyl]—O—CH$_2$—COOH |  |
| 9 | H$_5$C$_2$—CH$_2$—C(O)—[phenyl]—OH | H$_5$C$_2$—C(O)—C(=CH$_2$)—[phenyl]—O—CH$_2$—COOH | Ex. 1, Steps A–G. |
| 10 | CH$_3$—CH$_2$—C(O)—[Cl-phenyl]—OH | CH$_3$—C(O)—C(=CH$_2$)—[Cl-phenyl]—O—CH$_2$—COOH | Ex. 3, Steps A–C. |
| 11 | H$_2$C(CH$_2$—CH$_2$)(CH$_2$—CH$_2$)CH—CH$_2$—C(O)—[Cl-phenyl]—OH | H$_2$C(CH$_2$—CH$_2$)(CH$_2$—CH$_2$)CH—C(O)—C(=CH$_2$)—[Cl-phenyl]—O—CH$_2$—COOH | Ex. 4, Steps A–B. |
| 12 | H$_5$C$_2$—CH$_2$—C(O)—[naphthyl]—OH | H$_5$C$_2$—C(O)—C(=CH$_2$)—[naphthyl]—O—CH$_2$—COOH | Ex. 7, Steps A–C. |
| 13 | H$_5$C$_2$—CH$_2$—C(O)—[H$_3$C,H$_3$C-phenyl]—OH | H$_5$C$_2$—C(O)—C(=CH$_2$)—[H$_3$C,H$_3$C-phenyl]—O—CH$_2$—COOH | Ex. 5, Steps A–C. |

The novel compounds of this invention are effective diuretic and/or saluretic agents. Because of this property, they are useful in therapy for the treatment of conditions resulting from an excessively high concentration of electrolyte in the body or an excessively high retention of fluid in the body such as in the treatment of edematous conditions resulting, for example, from congestive heart failure.

It will be appreciated that the dosage of the novel compounds of this invention will vary over a wide range depending upon the age and weight of the patient to be treated, upon the particular ailment to be treated, and the relative potency of the selected diuretic agent. For these reasons, tablets, pills, capsules and the like containing, for example, 25, 50, 100, 150, 250, 500 mg. or more of active ingredient can be made available for the symptomatic adjustment of the dosage to the individual patient.

What is claimed is:
1. A process for preparing a compound of the formula

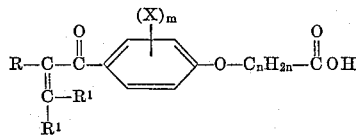

where R is a member selected from the group consisting of hydrogen, lower alkyl, halo-lower alkyl, cycloalkyl, cycloalkylalkyl,

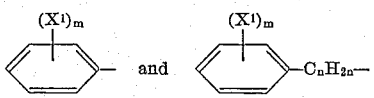

wherein $X^1$ is a member selected from the group consisting of hydrogen, halogen, lower alkyl, trifluoromethyl, lower alkoxy and carboxy, $R^1$ is a member selected from the group consisting of hydrogen and lower alkyl, X is a member selected from the group consisting of hydrogen, halogen, lower alkyl, trifluoromethyl and lower alkoxy and, when substituted on adjacent carbon atoms of the benzene ring, two X radicals may be combined to form a 1,3-butadienylene linkage, $m$, in each occurrence, is an integer having a value of 1–4 and $n$, in each occurrence, is an integer having a value of 1–5, which comprises the reaction of a compound of the formula

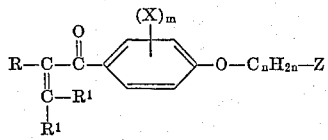

where R, $R^1$, X, $m$ and $n$ are as defined above and Z is a vinyl group with chromium trioxide.

2. A process for preparing a compound of the formula

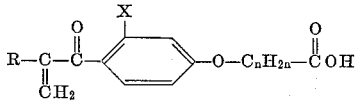

where R is lower alkyl, X is halogen and $n$ is an integer having a value of 1–5, which comprises the reaction of a compound of the formula

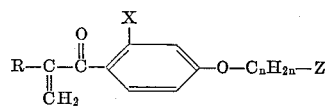

where R, X and $n$ are as defined above and Z is a vinyl group with chromium trioxide.

3. A process for preparing a compound of the formula

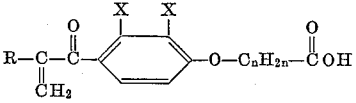

where R is lower alkyl, X is halogen and $n$ is an integer having a value of 1–5, which comprises the reaction of a compound of the formula

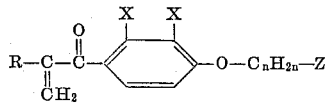

where R, X and $n$ are as defined above and Z is a vinyl group with chromium trioxide.

4. A process for preparing [3-chloro-4-(2-methylenebutyryl)phenoxy]acetic acid which comprises the reaction of 3-chloro-4-(2-methylenebutyryl)allyloxybenzene with chromium trioxide.

5. A process for preparing [2,3-dichloro-4-(2-methylenebutyryl)phenoxy]acetic acid which comprises the reaction of 2,3-dichloro-4-(2-methylenebutyryl)allyloxybenzene with chromium trioxide.

References Cited by the Examiner
UNITED STATES PATENTS
2,744,929  5/1956  Smith et al. _____ 260—530

OTHER REFERENCES
Goldberg et al., J. Chem. Soc. (1928), page 2355.
Heilbron et al., J. Chem. Soc. (1949), pp. 604–606.
Royals, "Advanced Organic Chemistry" (1954), pp. 593, 628–629.
Wagner et al., "Synthetic Organic Chemistry" (1953), pp. 290–291 and 419.

LORRAINE A. WEINBERGER, *Primary Examiner.*
S. B. WILLIAMS, *Assistant Examiner.*